United States Patent [19]
Miyahara et al.

[11] 4,159,205
[45] Jun. 26, 1979

[54] PROCESS FOR PRODUCING POLYCRYSTALLINE OXIDE FIBERS

[75] Inventors: Kenichiro Miyahara; Nobuji Nakayama, both of Chiba, Japan

[73] Assignee: The Carborundum Company, Niagara Falls, N.Y.

[21] Appl. No.: 808,950

[22] Filed: Jun. 22, 1977

[30] Foreign Application Priority Data

Jul. 23, 1976 [JP] Japan .................................. 51/87827

[51] Int. Cl.² .......................... C01F 7/02; C04B 35/10
[52] U.S. Cl. .................................. 106/73.4; 423/608; 423/625
[58] Field of Search ............... 106/73.4; 423/608, 625, 423/626

[56] References Cited
U.S. PATENT DOCUMENTS

| 2,915,475 | 12/1959 | Bugosh | 423/626 |
| 3,180,741 | 4/1965 | Wainer et al. | 423/626 |
| 3,270,109 | 8/1966 | Kelsey | 423/608 |
| 3,357,791 | 12/1967 | Napier | 423/626 |
| 3,790,495 | 2/1974 | Podschus | 423/626 |

FOREIGN PATENT DOCUMENTS

| 1360197 | 7/1974 | United Kingdom | 423/626 |
| 1360200 | 7/1974 | United Kingdom | 423/626 |

Primary Examiner—O. R. Vertiz
Assistant Examiner—Mark Bell
Attorney, Agent, or Firm—David E. Dougherty; Raymond W. Green; Michael L. Dunn

[57] ABSTRACT

A process for the manufacture of an aluminum oxide or zirconium oxide fiber comprising fiberizing a liquid containing lactic acid and an oxidizable compound selected from basic aluminum chloride, zirconium acetate and zirconium oxychloride and the resulting fibers. The liquid optionally also contains colloidal silica.

16 Claims, No Drawings

PROCESS FOR PRODUCING POLYCRYSTALLINE OXIDE FIBERS

BACKGROUND OF THE INVENTION

This invention relates to a process for producing oxide fibers and more particularly relates to a method for producing polycrystalline oxide fibers from basic aluminum chloride, zirconium acetate, zirconium oxychloride or mixtures thereof and the resulting fibers.

It is known in the prior art that certain oxide precursors may be dissolved in liquid and spun to form a fiber and the resulting fiber heated in an oxygen containing atmosphere to form an oxide fiber. For example, basic aluminum chloride may be dissolved in water and the resulting solution spun to form a basic aluminum chloride fiber which upon heating converts to a polycrystalline aluminum oxide fiber. Difficulties were encountered in prior art processes for the manufacture of polycrystalline oxide fibers. In particular, it was frequently not possible to dissolve sufficient oxide precursor in the liquid without obtaining viscosities which were too high for spinning. The dissolving of insufficient oxide precursor in the spinning liquid results in a solution which yields inferior fibers, if any.

Prior art polycrystalline fibers had insufficient strength and flexibility for many applications.

In the prior art, it was found that the addition of acetic acid to the spinning liquid substantially reduced its viscosity; however, the resulting fiber was still too brittle for many applications.

BRIEF DESCRIPTION OF THE INVENTION

In accordance with this invention there is provided a process for the manufacture of oxide fibers which comprises fiberizing a liquid having a viscosity between about 1 and 1000 poise. The liquid contains from about 40 to about 70 weight percent of an oxidizable compound selected from basic aluminum chloride, zirconium acetate, zirconium oxychloride and mixtures thereof and in addition contains from about 2 to about 50 percent by weight of said compound of lactic acid. The liquid may also optionally contain colloidal silica. "Colloidal silica" as used herein means particulate silicon dioxide having particle sizes small enough to form a colloid which dispersed in water. The presence of colloidal silica has been found to reduce shrinkage in the finished oxide fiber. After the liquid is fiberized, preferably by spinning, the resulting fiber is dried and heated; often in an oxygen containing atmosphere for a sufficient time and at a sufficient temperature to convert the compound to aluminum oxide, zirconium oxide, or mixtures thereof.

The incorporation of the lactic acid into the spinning solution permits the spinning of liquids which contain a higher percentage of basic aluminum chloride, zirconium acetate, zirconium oxychloride or mixtures thereof or mixtures of these compounds and colloidal silica than was obtained in the prior art without the use of acetic acid and results in a fiber having greater flexibility than prior art aluminum oxide or zirconium oxide fibers. The invention further comprises the fiber manufactured in accordance with the process of the invention.

DETAILED DESCRIPTION OF THE INVENTION

In accordance with the invention, the liquid is fiberized by any convenient method. For example, centrifugal spinning, drawing, blowing, tack-spinning, extrusion of the liquid through a spinneret or suitable combinations thereof.

The viscosity of the liquid is preferably one suitable to the fiberizing method employed and is usually between about 1 and about 1000 poise for spinning operation and is preferably between about 70 and 300 poise. Lower viscosities, particularly when the liquid is fiberized by means of spinning, may result in very poor fiber, if any, which includes a high percentage of shot which may actually be the sole product. Higher viscosities become difficult to spin partly because very high pressures are required to force the liquid through a spinneret.

The fiber is dried by any suitable means, for example, by heating the fiber at a temperature from about 30 to about 150° C., optionally under a reduced pressure. Any other suitable means for drying the fiber may be employed, for example, by circulating dehumidified air or gas around the fiber. Very high temperatures can be used to dry the resulting fiber but are not generally preferred due to greater energy requirements. Drying temperatures as high as 1,200° C. may however, be used.

The dried fiber is heated for a sufficient time and at a sufficient temperature to oxidize the lactic acid and to convert the aluminum chloride, zirconium acetate or zirconium oxychloride to aluminum oxide, zirconium oxide or mixtures thereof. The heating may occur in an oxygen free atmosphere since the presence of water in the spinning liquid is believed to convert basic aluminum chloride, zirconium acetate or zirconium oxychloride to hydrates which convert to oxides upon heating. The atmosphere may however, contain oxygen and may be pure oxygen. The preferred heating environment is an atmosphere of dry air.

The heating temperature is preferably between about 700° and about 2000° C. and more preferably between about 850° and about 1500° C. The heating time is in excess of about 15 minutes and is preferably in excess of about 1 hour.

The spinning liquid contains from about 40 to about 70 weight percent of basic aluminum chloride, zirconium acetate, zirconium oxychloride or mixtures thereof or mixtures of these compounds and colloidal silica as previously discussed. In the preferred embodiment the spinning solution contains basic aluminum chloride having a ratio of aluminum to chlorine of between 1.7 to 1 and 2.1 to 1 or mixtures of basic aluminum chloride having this ratio and colloidal silica. Such a zpinning solution can contain up to about 20 weight percent colloidal silica which silica can replace up to about 45 weight percent of the aluminum oxide in the finished fiber. Desirably, the fiberizable liquid, which is preferably a spinning liquid, contains from about 50 to about 60 weight percent basic aluminum chloride.

The fiberizable liquid contains from about 2 to about 50 percent lactic acid by combined weight of oxidizable compound which is preferably basic aluminum chloride with colloidal silica. The most desirable percentage of lactic acid is from about 5 to about 15 weight percent of said compound.

Fiber produced in accordance with the invention has excellent refractoriness and flexibility and is believed to comprise a fiber which is either non-crystalline or which contains small inter-connecting or inter-twined crystallites. Such crystallites in the case of aluminum oxide are believed to be in the eta form. Such fibers, produced in accordance with this invention, may be referred to herein as polycrystalline fibers.

Fibers manufactured in accordance with this invention, particularly fibers containing between about 25 and 30 weight percent silica, are found to retain excellent flexibility even when they are exposed to temperatures of 1500° C. or higher.

The diameter of fibers produced in accordance with this invention is desirably between about 0.5 and about 500 microns and preferrably between about 2 and about 15 microns. Such diameters are determined by the fiberizing conditions, e.g. the size of the spinneret orifices and by the characteristics of the liquid being fiberized, particularly the viscosity of the liquid and the percentages of oxidizable compound and lactic acid in the liquid. Higher viscosities and higher solids content in the liquid results in larger diameters.

Any means apparent to those skilled in the art may be used for spinning the liquid. For example, the spinning liquid may be placed in a centrifugal ejection spinning machine in the form of a cylinder having a plurality of nozzle orifices in its peripheral surface. Rotation of the spinning machine at a high speed causes the spinning solution to be ejected through the nozzle orifices into a drying atmosphere to convert the liquid into fibrous form. Thereafter the resulting fibrous material is dried to remove water and calcined, i.e. heated at a high temperature, e.g. between 700° and about 1500° C., to produce a polycrystalline fiber.

Alternatively, the liquid may be placed in a container having nozzle orifices and allowed to fall onto a rapidly revolving disc located under the container. As a result, the falling spinning solution is blown off into a drying atmosphere and thereby spun or converted into fibrous form. The resulting fibers are dried and heated as previously discussed. In another example, the liquid is placed in a container having nozzle orifices and allowed to fall while supplying a high speed gas stream in a transverse direction. As a result, the falling spinning solution is blown off into a drying atmosphere and thereby converted into fibrous form.

The following examples serve to illustrate and not limit the invention. Unless otherwise indicated all parts and percentages are by weight.

EXAMPLE 1

A basic aluminum chloride aolution having a solids content of 52 percent, a viscosity of 80 poise at 19° C. and an atomic ratio of aluminum to chlorine of 2 to 1 is prepared by heating a solution of anhydrous aluminum chloride in water and causing aluminum metal powder to react with and dissolve in the solution. The solution is employed as a spinning material. To this basic aluminum chloride solution, various organic acids as shown in Table 1 are added in an amount of 8.8 weight percent based on the total solids of the basic aluminum chloride solution. 2.5 hours after mixing, the viscosities of the spinning solutions are obtained. The results are set forth in Table 1.

TABLE 1

| Organic Acid Added | Viscosity of Spinning Solution (poises) |
|---|---|
| No additive | 80 |
| Lactic acid | 2 |
| Acetic acid | 3 |
| Oxalic acid | 28 |
| Malic acid | 70 |
| Citric acid | Gelling |
| Tartaric acid | Gelling |
| Maleic acid | Gelling |
| Succinic acid | Gelling |

An examination of Table 1 clearly shows that lactic acid and acetic acid are the only additives tested which substantially reduce the viscosity of the solution. When acetic acid is used, the odor of acetic acid is found to be irritating; whereas, when lactic acid is used, the odor is minimal.

EXAMPLE 2

Lactic acid in varying proportions is added to a basic aluminum chloride solution having a viscosity of 72 poise at 21° C., a solids content of 55 weight percent and an atomic ratio of aluminum to chlorine of 2 to 1. The viscosity of the resulting solutions are measured after 2.5 hours. The results show that the viscosity of the basic aluminum chloride solution can be effectively reduced by adding lactic acid thereto in amounts of 2 percent by weight or more and preferrably above 6 percent by weight based on the total solids. Amounts of lactic acid in excess of 12 percent result in only a slight additional reduction in viscosity.

EXAMPLE 3

Two basic aluminum chloride solutions, each having a viscosity of 1000 poise at 20° C. and an atomic ratio of aluminum to chlorine of 2 to 1 are prepared. One of the solutions contains 8.9 percent by weight of lactic acid and the other solution contains no additive. The solution which contains no additive has a solids content of 53.75 percent whereas the solution containing lactic acid has a solids content of 55.65 percent demonstrating that increased solids can be obtained and tolerated when lactic acid is used as an additive.

EXAMPLE 4

A basic aluminum chloride-colloidal silica spinning solution having a solids content of 55 percent is prepared. The silica ($SiO_2$) is present in an amount of about 3 percent and the solution has a viscosity of 52 poise at 20° C. The basic aluminum chloride has an atomic ratio of aluminum to chlorine of 2 to 1. A series of spinning solutions are then prepared by adding lactic acid to the basic aluminum chloride-colloidal silica solution in varying proportions. The results show that the viscosity of the basic aluminum chloride-colloidal silica solution in varying proportions. The results show that the viscosity of the basic aluminum chloride-colloidal silica solution is effectively reduced by adding lactic acid to the solution in an amount of 3 percent by weight or more and that a substantial reduction is obtained when the amount of lactic acid is in excess of 6 percent. Additions of lactic acid in excess of 12 percent provide only a slight further decrease in viscosity.

EXAMPLE 5

The procedure of Example 4 is followed except that a zirconium acetate-zirconium oxychloride solution is used as a spinning solution having a viscosity of 50 poise at 20° C. Solids in the solution consist of 70 percent zirconium acetate and 30 percent zirconium oxychloride. The results show that the addition of 2 percent lactic acid reduces the viscosity of the solution and 3 percent substantially reduces its viscosity. A very large reduction in viscosity is observed when the lactic acid is present in the amount of 6 percent or more. As in previous examples, additions of lactic acid in excess of 12 percent provide only a slight further decrease in viscosity.

EXAMPLE 6

A basic aluminum chloride solution is prepared from a reagent grade aluminum chloride and aluminum metal in water to obtain a viscosity of 150 poise at room temperature. Differing aluminum to chlorine ratios are prepared. The results are shown in Table 2.

TABLE 2

| Experiment | Intended Atomic Av/Cl Ratio | Observations during Concentration by Heating | Properties of Aluminum Oxide Fibers obtained after Calcination | |
|---|---|---|---|---|
| | | | Shot Content (%) | Number of Flexings to Break |
| 1 | 0.83 | Insoluble salts precipitated. | — | — |
| 2 | 1.16 | Insoluble salts precipitated. | — | — |
| 3 | 1.50 | Water-clear during and after concentration. | 52.1 | 0 |
| 4. | 1.70 | Water-clear during and after concentration. | 100 | — |
| 5 | 1.85 | Insoluble salts precipitated. | — | — |
| 6. | 2.00 | Water-clear during and after concentration. | 49.6 | 12 |
| 7 | 2.20 | Insoluble salts precipitated. | — | — |

This example shows that within a certain narrow range of aluminum to chlorine ratio, the solution can be concentrated to an extent which permits fiberizing. It is evident from Table 2 that the properties of the aluminum oxide fibers obtained from such solutions are unsatisfactory. Attempts were made to form fibers with each solution by introducing the solution into a centrifugal spinning device provided with a plurality of holes having 0.5 mm diameters and spinning the device at 900 rmp to fiberize the solutions. The only solutions which could be fiberized are those having aluminum to chlorine ratios of 1.5 to 1, 1.7 to 1 and 2.0 to 1. The remaining solutions have insoluble precipitated salts. The only ratios which provided a weight ratio of fiber to shot which provides enough fiber for testing are the atomic ratios of aluminum to chlorine of 1.5 to 1 and 2 to 1. The fibers obtained from each of these two solutions are calcined (oxidize) at 900° C. and shaped into a specimen in the form of a blanket about 12 mm thick. The resulting blanket is then flexed by hand in order to determine the number of flexings to break (hereinafter referred to as "flexibility"). The flexibility of each of the blankets is extremely poor.

EXAMPLE 7

Example 6 is essentially repeated except various proportions of acetic acid are added to a technical-grade basic aluminum chloride solution containing about 50 percent of basic aluminum chloride ($Al_2(OH)_5Cl.2.4-H_2O$). The atomic ratio of aluminum to chlorine is about 2 to 1. The solution is then heated to concentrate the mixture to obtain a viscosity of about 150 poise. The results are given in Table 3.

TABLE 3

| Experiment | Basic Aluminum Chloride Solution (parts) | Acetic Acid (parts) | Observations during Concentration by Heating | Properties of Aluminum Oxide Fibers Obtained after Calcination | |
|---|---|---|---|---|---|
| | | | | Shot Content (%) | Flexibility (No. of Flexings to Break) |
| 1 | 2,000 | 200 | Insoluble salts precipitated | — | — |
| 2 | 2,000 | 170 | Insoluble salts precipitated | — | — |
| 3 | 2,000 | 150 | Insoluble salts precipitated | — | — |
| 4 | 2,000 | 125 | Insoluble salts precipitated | — | — |
| 5 | 2,000 | 100 | Water-clear during and after concentration | 5 | 96 |
| 6 | 2,000 | 45 | Water-clear during and after concentration | 12 | 48 |

This example shows that high ratios of acetic acid to basic aluminum chloride results in the precipitation of insoluble salts. At low ratios of acetic acid to basic aluminum chloride, an improvement is observed both in a reduction in shot content and in increased flexibility. The flexibility however, is still not as great as desired, i.e., a flexibility of at least 200 flexings.

EXAMPLE 8

The procedure of Example 7 is followed except acetic acid is eliminated from the solutions and lactic acid is added in varying ratios to basic aluminum chloride solution at varying atomic ratios of aluminum to chloride. The results are set forth in Table 4.

TABLE 4

| Experiment | Atomic Al/Cl Ratio | Parts of Lactic Acid* | Fiber Properties | |
|---|---|---|---|---|
| | | | Shot Content % | Flexibility** |
| 1 | 1.85 | 12.3 | 11.4 | More than 200 |
| 2 | 1.95 | 27.1 | 8.7 | More than 200 |
| 3 | 1.92 | 56.8 | 3.5 | More than 200 |
| 4 | 2.10 | 96.8 | 2.9 | More than 200 |
| 5 | 2.18 | 141.5 | 11.0 | 13 |
| 6 | 2.0 | 4.5 | 11.7 | 40 |
| 7 | 1.5 | 4.9 | 18.7 | 15 |
| 8 | 1.7 | 4.9 | 11.9 | More than 200 |
| 9 | 1.7 | 8.6 | 4.1 | More than 200 |
| 10 | 1.85 | 23.7 | 7.0 | More than 200 |
| 11 | 2.0 | 24.4 | 1.1 | More than 200 |
| 12 | 1.85 | 40.1 | 3.8 | More than 200 |

*Parts per 100 of basic aluminum chloride solids obtained by evaporating the solution at 100° C.
**Number of flexings of calcined fibers to break.

In all experiments shown in Table 4, the solutions are water clear initially, during and after concentration.

The results indicate that the use of lactic acid provides superior flexibility to the fibers. The results further indicate that the atomic ratio of alumina to chlorine should be above about 1.5 and that the percentage of lactic acid should be at least about 5 parts and less than about 100 parts of lactic acid per 100 parts of basic aluminum chloride solids, i.e., about 5 percent to about 50 percent lactic acid by weight of basic aluminum chloride solids.

EXAMPLE 9

Colloidal silica is added in varying proportions to aluminum chloride solutions which contain about 50 percent basic aluminum chloride ($Al_2(OH)_5Cl.2.4H_2O$), in the form of a colloidal silica suspension containing about 20 weight percent of $SiO_2$. Then lactic acid is added to each solution in the proportion of about 10.5 weight percent to total solids in the solutions. The solutions are concentrated by heating until their viscosity is about 150 poise at room temperature. The solutions are then fiberized by the same procedure as shown in Example 6. After drying, the fibers are calcined at 1250° C. for 30 minutes then heated to about 1500° C. in air for 24 hours. The resulting fibers are tested by the same procedures as shown in Example 6. The results are shown in Table 5.

TABLE 5

| Experiment | Parts of Basic Aluminum Chloride Solution | Parts of Lactic Acid | Parts of Colloidal Silica | Approximate $Al_2O_3/SiO_2$ Weight Ratio In Finally Heated Fiber $Al_2O_3$ % | $SiO_2$ % | Flexibility Number of Flexings To Break 1500° C. |
|---|---|---|---|---|---|---|
| 1 | 2000 | 120 | 123 | 95 | 5 | 63 |
| 2 | 2000 | 123 | 260 | 90 | 10 | 21 |
| 3 | 2000 | 127 | 413 | 85 | 15 | 32 |
| 4 | 2000 | 131 | 585 | 80 | 20 | 52 |
| 5 | 2000 | 136 | 781 | 75 | 25 | More than 200 |
| 6 | 2000 | 139 | 911 | 72 | 28 | More than 200 |
| 7 | 2000 | 141 | 1004 | 70 | 30 | More than 200 |
| 8 | 2000 | 147 | 1262 | 65 | 35 | 15 |

The results indicate that, when practicing this invention at 1500° C., the resulting fibers have excellent flexibility when the fibers have a weight ratio of aluminum oxide to silicon dioxide of between 70 to 30 and 75 to 25.

In using lactic acid, it has been further discovered that the concentrated spinning solution can be readjusted to the most desirable viscosity by introducing lactic acid just prior to spinning whereas acetic acid may not be introduced just prior to spinning due to acetic acid solubility limits in the spinning solution. Furthermore, it has been found that fibers may be prepared in ordinary room air with proper ventilation when lactic acid is used as an additive; whereas, when acetic acid is used, the atmosphere should not have a relative humidity higher than 60 percent and preferably 20 to 30 percent. Fiber prepared when acetic acid is used as an additive, must be stored in an atmosphere having a low relative humidity; whereas, fibers prepared when lactic acid is used as an additive, may be placed in a plastic bag and stored under ambient conditions. The above advantages are in addition to the previously discussed advantages for the use of lactic acid, i.e., the odor of vaporized acetic acid is avoided when lactic acid is used as the spinning solution additive and unexpectedly the use of lactic acid provides low shot content and extremely high flexibility; whereas, the use of acetic acid results in the fiber having low flexibility.

What is claimed is:

1. A process for the manufacture of oxide fiber comprising:
   (a) fiberizing a liquid having a viscosity between about 1 and about 1000 poise, said liquid containing 40 to about 70 weight percent of basic aluminum chloride, and containing from about 2 to about 50 percent of lactic acid by weight of aluminum chloride;
   (b) drying the resulting fiber; and
   (c) heating said dried fiber for a sufficient time and at a sufficient temperature to convert the aluminum chloride to aluminum oxide.

2. The process of claim 1, wherein said sufficient temperature is from about 700° C. to about 2000° C., said sufficient time is in excess of about 15 minutes, said fiber is heated in an oxygen containing atmosphere and said fiberizing is accomplished by spinning said liquid.

3. The process of claim 2, wherein said sufficient time is in excess of 1 hour.

4. The process of claim 3, wherein said sufficient temperature is between about 850° and about 1500° C.

5. The process of claim 3, wherein said liquid contains from about 50 to about 60 weight percent of basic aluminum chloride.

6. The process of claim 5, wherein the basic aluminum chloride has a ratio of aluminum to chlorine between 1.7 to 1 and 2.1 to 1.

7. The process of claim 6, wherein the liquid has a viscosity below about 300 poises.

8. The process of claim 1, wherein said liquid contains from about 5 to about 15 percent by weight of said compound of lactic acid.

9. The process of claim 6, wherein said viscosity is between about 70 and about 300 poises.

10. The process of claim 1, wherein from about 1 to about 20 weight percent colloidal silica is added to the liquid.

11. The process of claim 10, wherein said liquid contains basic aluminum chloride.

12. The process of claim 11, wherein the heated fiber comprises a mixture of aluminum oxide and silicon dioxide.

13. The process of claim 12, wherein the weight ratio of aluminum oxide to silicon dioxide is in between 55 to 45 and 98 to 2.

14. The process of claim 13, wherein said ratio is preferably between 70 to 30 and 75 to 25.

15. The process of claim 11, wherein said basic aluminum chloride has an atomic ratio of aluminum to chlorine of between 1.7 to 1 and 2.1 to 1.

16. The process of claim 10, wherein said silicon dioxide is in the form of colloidal silica suspension.

* * * * *